(12) United States Patent
Kneller et al.

(10) Patent No.: US 9,899,140 B2
(45) Date of Patent: Feb. 20, 2018

(54) MULTI-TAP WINDING DESIGN FOR EMBEDDED TRANSFORMER

(71) Applicant: Murata Manufacturing Co., Ltd., Nagaokakyo-shi, Kyoto-fu (JP)

(72) Inventors: Quinn Kneller, Milton Keynes (GB); Scott Parish, Milton Keynes (GB); Lee Francis, Milton Keynes (GB)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 15/498,765

(22) Filed: Apr. 27, 2017

(65) Prior Publication Data
US 2017/0316872 A1    Nov. 2, 2017

(30) Foreign Application Priority Data

Apr. 28, 2016    (GB) .................................. 1607435.3

(51) Int. Cl.
*H02M 5/12*    (2006.01)
*H01F 27/29*   (2006.01)
(Continued)

(52) U.S. Cl.
CPC ......... *H01F 27/29* (2013.01); *H01F 27/2804* (2013.01); *H02M 3/33507* (2013.01);
(Continued)

(58) Field of Classification Search
CPC ............. H02M 5/10; H02M 5/12; H02M 5/18
See application file for complete search history.

(56) References Cited

U.S. PATENT DOCUMENTS

| 4,775,766 A | 10/1988 | Kooy et al. |
| 5,959,846 A | 9/1999 | Noguchi et al. |

(Continued)

FOREIGN PATENT DOCUMENTS

| GB | 2 348 321 A | 9/2000 |
| GB | 2528990 A | 2/2016 |

(Continued)

OTHER PUBLICATIONS

Official Communication issued in corresponding Patent Application No. GB1607435.3, dated Sep. 8, 2016.
Parish et al., "Embedded Magnetic Component Device", U.S. Appl. No. 14/825,327, filed Aug. 13, 2015.
Kneller et al., "Embedded Magnetic Component Device", U.S. Appl. No. 14/825,332, filed Aug. 13, 2015.
(Continued)

*Primary Examiner* — Matthew Nguyen
*Assistant Examiner* — Ishrat Jamali
(74) *Attorney, Agent, or Firm* — Keating & Bennett, LLP

(57) ABSTRACT

An embedded magnetic component transformer device includes an insulating substrate with a cavity and a magnetic core housed within the cavity. First and second electrical windings pass through the insulating substrate around the magnetic core. The first electrical winding includes a first end terminal and a second end terminal, and a first tap terminal between the first and second end terminals. The device includes circuitry with a first input terminal electrically connected to the first end terminal and a first output terminal. In a first configuration of the circuitry, the first output terminal is electrically connectable to the second end terminal. In a second configuration of the circuitry, the first output terminal is electrically connectable to the first tap terminal.

16 Claims, 6 Drawing Sheets

(51) Int. Cl.
  *H02M 3/335* (2006.01)
  *H01F 27/28* (2006.01)
  *H02M 5/10* (2006.01)
  *H02M 5/18* (2006.01)

(52) U.S. Cl.
  CPC .............. *H02M 5/10* (2013.01); *H02M 5/12* (2013.01); *H02M 5/18* (2013.01)

(56) References Cited

U.S. PATENT DOCUMENTS

| | | |
|---|---|---|
| 7,298,238 B1 | 11/2007 | Eaton et al. |
| 2004/0070893 A1 | 4/2004 | Ahn et al. |
| 2009/0273428 A1 | 11/2009 | Chen |
| 2012/0025941 A1 | 2/2012 | Wang et al. |
| 2016/0111197 A1 | 4/2016 | Kneller |
| 2016/0231756 A1* | 8/2016 | Baerthlein ................. G05F 1/14 |
| 2016/0269019 A1* | 9/2016 | Petersen ................... G05F 1/14 |

FOREIGN PATENT DOCUMENTS

| | | |
|---|---|---|
| GB | 2529235 A | 2/2016 |
| JP | 2001-126936 A | 5/2001 |

OTHER PUBLICATIONS

Francis, "Embedded Magnetic Component Device", U.S. Appl. No. 14/883,854, filed Oct. 15, 2015.
Wang et al., "Embedded Magnetic Component Transformer Device", U.S. Appl. No. 14/883,855, filed Oct. 15, 2015.
Kneller, "Embedded Magnetic Component Transformer Device", U.S. Appl. No. 14/883,859, filed Oct. 15, 2015.
Kneller, "Embedded Magnetic Component Transformer Device", U.S. Appl. No. 14/883,863, filed Oct. 15, 2015.
Wang et al., "Embedded Magnetic Component Transformer Device", U.S. Appl. No. 14/883,866, filed Oct. 15, 2015.
Kneller et al., "Embedded Magnetic Component Transformer", U.S. Appl. No. 15/019,240, filed Feb. 9, 2016.
Parish et al., "Embedded Magnetic Component Device", U.S. Appl. No. 15/054,412, filed Feb. 26, 2016.
Lloyd, "Embedded Magnetic Component", U.S. Appl. No. 15/049,414, filed Feb. 22, 2016.
Harber, "Embedded Magnetic Component Device", U.S. Appl. No. 15/050,536, filed Feb. 23, 2016.
Francis, "Power Electronics Device With Improved Isolation Performance", U.S. Appl. No. 15/498,769, filed Apr. 27, 2017.
Kneller et al., "DC-DC Converter Device", U.S. Appl. No. 15/703,086, filed Sep. 13, 2017.

* cited by examiner

MULTI-TAP WINDING DESIGN FOR EMBEDDED TRANSFORMER

BACKGROUND OF THE INVENTION

1. Field of the Invention

This present invention relates to an embedded transformer device, and more particularly to a multi-tap winding design for an embedded transformer device.

2. Description of the Related Art

Power supply devices typically use transformers as a portion of converter circuits. Embedded magnetic component transformer devices are advantageous, as they avoid bulky electrical windings and magnetic cores, which often contribute the most to the weight and size of the power supply device. Instead, an embedded design allows the transformer device to be miniaturized, reducing both its footprint on a circuit board and also reducing its production cost while still maintaining the electrical isolation requirements needed for safe and reliable operation.

As the voltage generated by, for example, a DC-to-DC converter depends both on the input (supply) voltage, the load conditions, and the properties of the transformer itself, it is often desirable to adjust the transformer to either provide a different output voltage, or to compensate for a change in the input voltage or the load conditions. These adjustments may be required during prototyping to allow the performance of the transformer device to be optimized. Adjustments are also useful during production, where a single modifiable or configurable transformer device may be used across a range of different products as an alternative to using separately configured transformer devices for each product in the range.

In particular, it is desirable to be able to vary the turn ratio to adjust the extent to which the input voltage is stepped up or down, for example to accommodate changes in supply voltage or loading.

In conventional transformers, the turn ratio between the primary and secondary windings may be changed by winding extra turns or unwinding excess turns from the magnetic core. In a planar transformer, turns may be added or removed by cutting or linking conductive tracks or traces on the outer layer of the planar printed circuit board. However, these techniques of adding or removing turns are not generally possible in an embedded transformer, because the turns and the magnetic core are encased within a protective insulating substrate at the point of manufacture and are not easily accessible thereafter.

Thus, there is a need to provide an embedded transformer device in which the turn ratio can be modified.

SUMMARY OF THE INVENTION

Preferred embodiments of the present invention provide an embedded transformer device in which the turn ratio is able to be modified.

According to a preferred embodiment of the present invention, an embedded magnetic component transformer device includes an insulating substrate including a first side and a second side opposite the first side, the substrate including a cavity located therein; a magnetic core housed within the cavity; a first electrical winding that passes through the insulating substrate and is wound around a first section of the magnetic core; and a second electrical winding that passes through the insulating substrate and is wound around a second section of the magnetic core not overlapping with the first section of the magnetic core. Each of the first and second electrical windings includes conductive connectors passing through the insulating substrate adjacent to or in a vicinity of the magnetic core, upper conductive traces disposed on the first side of the insulating substrate, and lower conductive traces disposed on the second side of the insulating substrate. The first electrical winding includes a first end terminal and a second end terminal, and a first tap terminal located between the first and second end terminals. The device includes circuitry with a first input terminal electrically connected to the first end terminal and a first output terminal. In a first configuration of the circuitry, the first output terminal is electrically connectable to the second end terminal, and when electrically connected, the circuitry energizes the whole of the first electrical winding between the first end terminal and the second end terminal senses a voltage induced across the whole of the first electrical winding between the first end terminal and the second end terminal. In a second configuration of the circuitry, the first output terminal is electrically connectable to the first tap terminal, and when electrically connected, the circuitry energizes a portion of the first electrical winding between the first end terminal and the first tap terminal senses a voltage induced across a portion of the first electrical winding between the first end terminal and the first tap terminal.

The device may further include a switch that switches between the first configuration and the second configuration, for example.

The switch may include a transistor, for example.

The switch may include a multi-pole switch, for example.

The device may further include a hardwired connector that sets the device into one of the first configuration or the second configuration, for example.

The hardwired connector may include a zero-Ohm link or a jumper, for example.

The device may further include an auxiliary electrical winding that passes through the insulating substrate and wound around a third section of the magnetic core not overlapping with the first or second sections of the magnetic core, for example.

The first electrical winding may include a second tap terminal located between the first tap terminal and the first end terminal; and in a third configuration of the circuitry, the first output terminal is electrically connectable to the second tap terminal, for example.

In the third configuration of the circuitry, when electrically connected, the circuitry may energize a portion of the first electrical winding between the first end terminal and the second tap terminal, the portion including fewer turns than are energized in the second configuration, for example.

In the third configuration of the circuitry, when electrically connected, the circuitry may sense a voltage induced across a portion of the first electrical winding between the first end terminal and the second tap terminal, the portion including fewer turns than are sensed in the second configuration, for example.

The second electrical winding may include a third end terminal and a fourth end terminal, and a third tap terminal located between the third and fourth end terminals, for example. The circuitry of the device may include a second input terminal electrically connected to the third end terminal and a second output terminal, for example. In a fourth configuration of the circuitry, the second output terminal may be electrically connectable to the fourth end terminal; and in a fifth configuration of the circuitry, the second output terminal may be electrically connectable to the third tap terminal, for example.

In the fourth configuration of the circuitry, when electrically connected, the circuitry may energize the whole of the second electrical winding between the third end terminal and the fourth end terminal; and in the fifth configuration of the circuitry, when electrically connected, the circuitry may energize a portion of the second electrical winding between the third end terminal and the third tap terminal, for example.

In the fourth configuration of the circuitry, when electrically connected, the circuitry may sense a voltage induced across the whole of the second electrical winding between the third end terminal and the fourth end terminal; and in the fifth configuration of the circuitry, when electrically connected, the circuitry may sense a voltage induced across a portion of the second electrical winding between the third end terminal and the third tap terminal, for example.

The second electrical winding may include a fourth tap terminal located between the third tap terminal and the third end terminal; and in a sixth configuration of the circuitry, the second output terminal may be electrically connectable to the fourth tap terminal, for example.

In the sixth configuration of the circuitry, when electrically connected, the circuitry may energize a portion of the second electrical winding between the third end terminal and the fourth tap terminal, the portion including fewer turns than are energized in the fifth configuration, for example.

In the sixth configuration of the circuitry, when electrically connected, the circuitry may sense a voltage induced across a portion of the second electrical winding between the third end terminal and the fourth tap terminal, the portion including fewer turns than are sensed in the fifth configuration, for example.

The first output terminal, the second end terminal, and the first tap terminal may be located on a principal surface of the device, for example.

The second output terminal, the fourth end terminal, and the third tap terminal may be located on a principal surface of the device, for example.

The first output terminal may be located at or in a vicinity of an edge of the insulating substrate, and the first tap terminal may be located between the first electrical winding and the first output terminal, for example.

The location of the first output terminal may be equidistant or substantially equidistant from two corners of the insulating substrate that are electrically connected by the edge, for example.

The second output terminal may be located at or in a vicinity of a corner of the insulating substrate, and the third tap terminal may be located between the second electrical winding and the second output terminal, for example.

A method for configuring the above embedded magnetic component transformer device includes inserting a zero-Ohm link between the first output terminal and the second end terminal; or inserting a zero-Ohm link between the first output terminal and the first tap terminal, for example.

The method may further include removing a zero-Ohm link between the first output terminal and the second end terminal; and inserting a zero-Ohm link between the first output terminal and the first tap terminal, for example.

The method may further include removing a zero-Ohm link between the first output terminal and the first tap terminal; and inserting a zero-Ohm link between the first output terminal and the second end terminal, for example.

A method for configuring the embedded magnetic component transformer device includes switching the device to electrically connect the first output terminal to the second end terminal; or switching the device to electrically connect the first output terminal to the first tap terminal, for example.

The method may further include switching the device to electrically disconnect the first output terminal from the second end terminal; and switching the device to electrically connect the first output terminal to the first tap terminal, for example.

The method may further include switching the device to electrically disconnect the first output terminal and the first tap terminal; and switching the device to electrically connect the first output terminal and the second end terminal, for example.

According to a preferred embodiment of the present invention, methods for manufacturing an embedded magnetic component transformer device are provided.

Preferred embodiments of the present invention provide an embedded magnetic component transformer device in which a number of different turn ratios between the first and second windings are able to be included within the same embedded transformer device, and in which a desired turn ratio is able to be selected or adjusted. Therefore, a manufacturer is able to produce and store a single embedded transformer device that is able to be applied to a variety of different applications which may desire or require different turn ratios. Accordingly, preferred embodiments of the present invention provide more efficient production and stock control and improve automation within a manufacturing facility of the embedded transformer device. The turn ratio of the embedded transformer is able to be conveniently adjusted, for example, when testing the device by applying various input voltage supplies and load characteristics. Further, a manufacturer is able to provide a variable embedded transformer device which is able to be set to a specific turn ratio, for example, further on in a production chain or by a customer, thereby increasing the efficiency of production. A switchable embedded transformer device according to preferred embodiments of the present invention may be dynamically adjustable, for example, the device may be able to automatically adjust the embedded transformer turn ratio to match changing supply or load conditions.

The above and other features, elements, steps, configurations, characteristics and advantages of the present invention will become more apparent from the following detailed description of preferred embodiments of the present invention with reference to the attached drawings.

DETAILED DESCRIPTION OF PREFERRED EMBODIMENTS

Preferred embodiments of the present invention will now be described in detail with reference to FIGS. 1 to 6. Note that the following description is in all aspects illustrative and not restrictive and should not be construed to restrict the applications or uses of the present invention in any manner.

Figure 1:
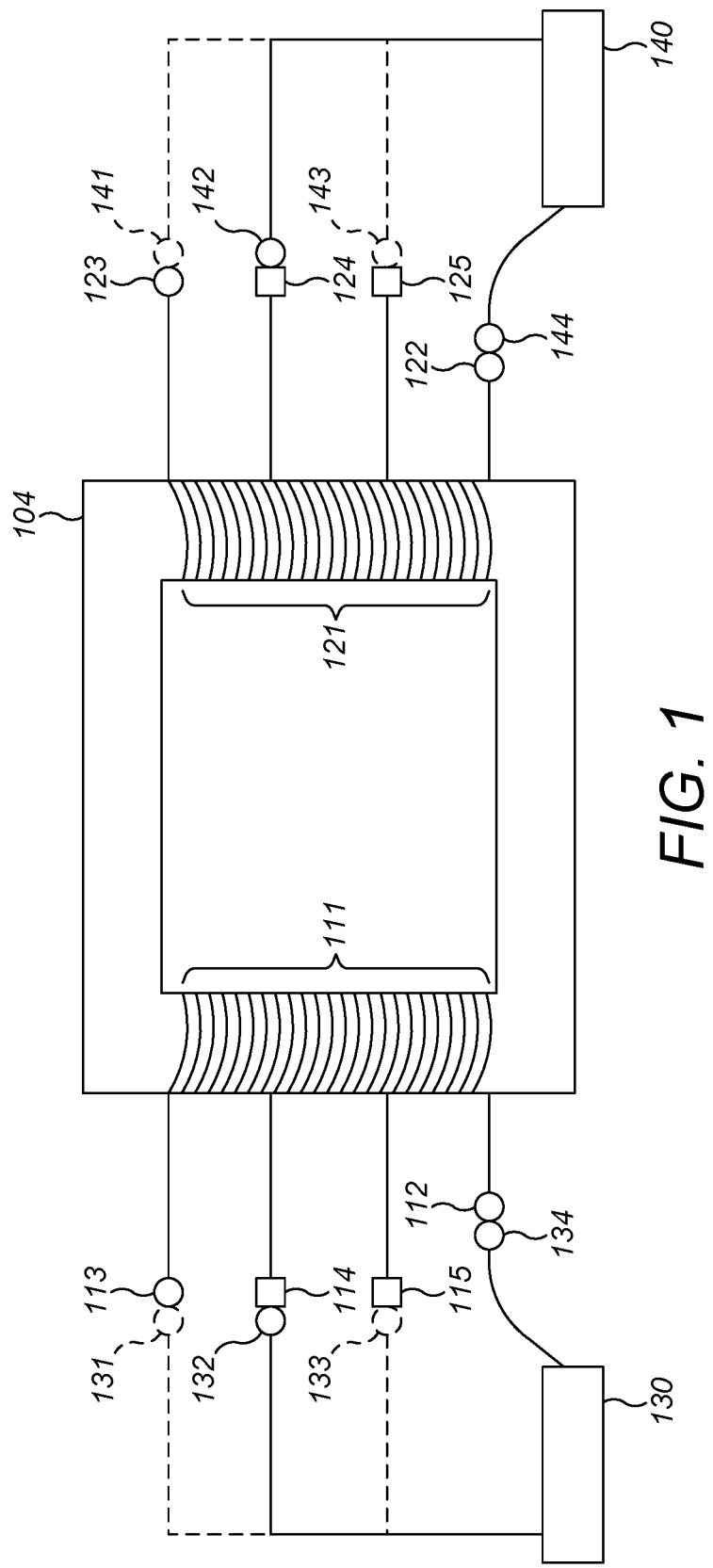
FIG. 1 is a schematic diagram showing an embedded transformer device according to a first preferred embodiment of the present invention.

FIG. 1 is a schematic diagram showing an embedded transformer device according to a first preferred embodiment of the present invention. The device includes a magnetic core 104 onto which a first electrical winding 111 and a second electric winding 121 are wound. The first electrical winding 111 includes a first end terminal 112 and a second end terminal 113. One or more tap terminals are electrically connected to the first electrical winding 111 between the first end terminal 112 and the second end terminal 113. As shown in FIG. 1, a first tap terminal 114 is provided between the first end terminal 112 and the second end terminal 113, and a second tap terminal 115 is provided between the first end terminal 112 and the first tap terminal 114.

A similar arrangement is provided with respect to the second electrical winding 121. Thus, the second electrical winding 121 includes a third end terminal 122 and a fourth end terminal 123. One or more tap terminals are electrically connected to the second electrical winding 121 between the third end terminal 122 and the fourth end terminal 123. As shown in FIG. 1, a third tap terminal 124 is provided between the third end terminal 122 and the fourth end terminal 123, and a fourth tap terminal 125 is provided between the third end terminal 122 and the third tap terminal 124.

However, for example, one or more tap terminals may be provided only on one of the first electrical winding 111 or the second electrical winding 121. The first electrical winding 111 and the second electrical winding 121 may include different numbers of tap terminals, for example.

The device further includes circuitry 130, for example, input-side circuitry, which includes an input terminal 134 and one or more output terminals. Input terminal 134 is located adjacent to or in a vicinity of, and electrically connected with, first end terminal 112. Output terminal 131 is located adjacent to or in a vicinity of second end terminal 113, output terminal 132 is located adjacent to or in a vicinity of first tap terminal 114, and output terminal 133 is located adjacent to or in a vicinity of second tap terminal 115. At most one of the one or more output terminals 131, 132, 133 is electrically connected to the first electrical winding 111. Output terminal 132 is electrically connected to the first electrical winding 111 at the first tap terminal 114, as shown in FIG. 1 by the solid line depicting output terminal 132. However, the device is able to switch to other configurations, for example, in which output terminal 132 is electrically disconnected from first tap terminal 114, and instead the output terminal 131 is electrically connected to second end terminal 113. In another configuration, for example, the output terminal 132 is electrically disconnected from first tap terminal 114, and instead the output terminal 133 is electrically connected to second tap terminal 115, as shown in FIG. 1 by the broken lines depicting output terminals 131 and 133. The device may be able to select or switch between any of the above-described configurations. The selecting or switching may be repeatable, or may only occur once by a single hard wired selection after which it is no longer possible to change the configuration, for example.

A similar arrangement may be provided with respect to the second electrical winding 121, for example. Therefore, the device may further include circuitry 140, for example, output-side circuitry, which includes an input terminal 144 and one or more output terminals. Input terminal 144 is located adjacent to or in a vicinity of, and electrically connected with, third end terminal 122. Output terminal 141 is located adjacent to or in a vicinity of fourth end terminal 123, output terminal 142 is located adjacent to or in a vicinity of third tap terminal 124, and output terminal 143 is located adjacent to or in a vicinity of fourth tap terminal 125. At most one of the one or more output terminals 141, 142, 143 is electrically connected to the second electrical winding 121. Output terminal 143 is electrically connected to the second electrical winding 121 at the fourth tap terminal 125, as shown in FIG. 1 by the solid line depicting output terminal 143. However, the device is able to switch to other configurations, for example, in which output terminal 143 is electrically disconnected from fourth tap terminal 125, and instead the output terminal 141 is electrically connected to fourth end terminal 123. In another configuration, for example, the output terminal 143 is electrically disconnected from fourth tap terminal 125, and instead the output terminal 142 is electrically connected to third tap terminal 124, as shown in FIG. 1 by the broken lines depicting output terminals 141 and 142. The device may be able to select or switch between any of the above-described configurations. The selecting or switching may be repeatable, or may only occur once by a single hard wired selection after which it is no longer possible to change the configuration, for example.

In the above-described examples, the selection or switching of or between any of the different configurations is able to be provided by using jumpers or zero-Ohm links to form the desired electrical connections between end or tap terminals and input or output terminals of the circuitry. In other preferred embodiments of the present invention, for example, a moveable electrical connection, multi-pole switch, or one or more transistors may be included to switch between different configurations.

Figure 2:
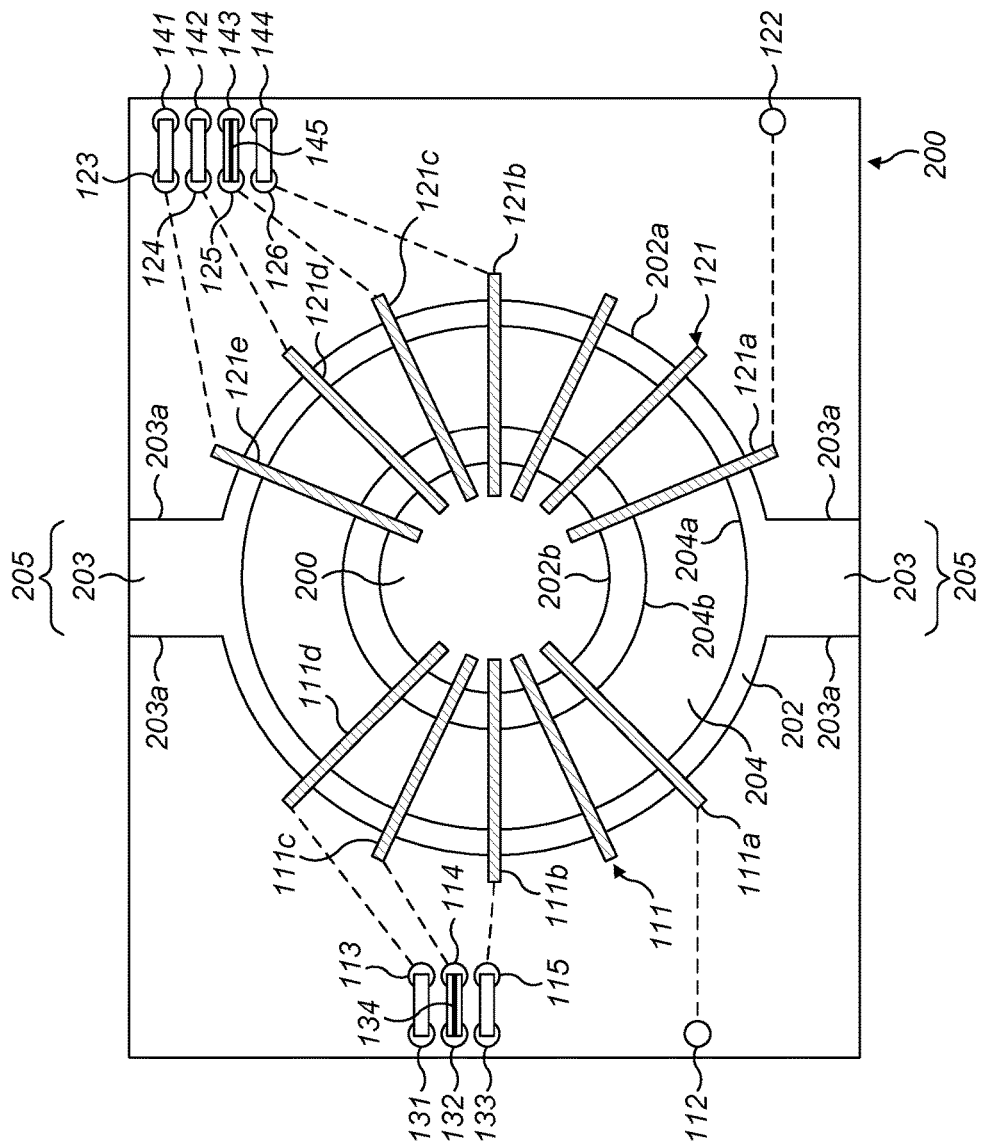
FIG. 2 is a plan schematic view of an embedded transformer device according to a second preferred embodiment of the present invention.

FIG. 2 is a plan schematic view of an embedded transformer device according to a second preferred embodiment of the present invention. Techniques for manufacturing an embedded magnetic component transformer device are described in UK patent applications GB1414469.5 and GB1414468.7, filed by the present applicant, which are incorporated herein by reference.

As shown in FIG. 2, the embedded transformer device includes an insulating substrate 200 into which a cavity 202 and one or more channels 203 are formed. The view in FIG. 2 is directed along the thickness direction of the insulating substrate 200. The insulating substrate 200 is preferably formed of a resin material, for example, FR4. FR4 is a composite 'pre-preg' material that includes woven fiberglass cloth impregnated with an epoxy resin binder. The resin is pre-dried but not hardened, and thus the resin flows and acts as an adhesive for the fiberglass material when heated. FR4 has been found to have desirable thermal and insulation properties.

The cavity 202 is formed by removing material from a block of insulating substrate 200, for example, to form a toroidal or substantially toroidal shape as shown in FIG. 2. The cavity 202 is therefore defined between outer periphery 202a and inner periphery 202b.

A magnetic core 204 is inserted into the cavity 202. In the second preferred embodiment shown in FIG. 2, the magnetic core 204 is toroidal or substantially toroidal, and includes an outer edge 204a and an inner edge 204b. The cavity 202 includes a shape that fits closely around the edges of the magnetic core 204.

One or more channels 203 are formed between cavity edges 203a in the insulating substrate 200 and connect the cavity 202 to the outside of the insulating substrate 200. The channels 203 and cavity 202 are preferably formed, for example, by a milling process, in which the first channel 203-1 is removed by the milling drill bit, followed by the cavity 202, followed by the second channel 203-2. Depending on the dimensions of the magnetic core 204, for example, it may be preferable that the width of the channels 203 match or substantially match the width of the cavity 202 for ease of manufacturing. In other preferred embodiments of the present invention, for example, the channels 203 and cavity 202 may have different widths. The channels 203 terminate at the outside of the insulating substrate 200 at channel openings 205. When the cavity 202 and channels 203 have been formed, a cover layer is provided on top of the cavity 202 and channels 203. The cover layer may be formed of the same or similar material to that of the insulating substrate 200, and may be solidly bonded to the insulating substrate 200, for example. The cover layer seals the magnetic core 204 within the cavity 202, and effectively becomes a portion of the insulating substrate 200 by providing the insulating substrate 200 with an upper surface. As described herein, the term lop surface' of the insulating substrate 200 refers to this upper surface of the cover layer. Note that the cover layer is not shown in FIG. 2 to provide a clearer illustration of the features of the magnetic core 204.

The channels or vents 203 allow air to circulate within the cavity 202, which significantly reduces or prevents overheating of the cavity 202 and the magnetic core 204. The channels 203 also enable air to escape from the cavity 202, for example, during an SMA reflow soldering process. In an SMA reflow soldering process, heat is applied to the device, which causes any air trapped within the cavity 202 to expand. The channels 203 provide a path for the expanding air to escape without damaging the device.

The embedded transformer device includes a first electrical winding 111 and a second electrical winding 121. Additional electrical windings, for example, one or more auxiliary windings, may also be provided, although these are omitted from FIG. 2 for the sake of clarity. According to a preferred embodiment of the present invention, the first electrical winding 111 is the primary (input side) winding of the transformer, and the second electrical winding 121 is the second (output side) winding of the transformer. According to another preferred embodiment of the present invention, the first electrical winding 111 is the secondary transformer winding, and the second electrical winding 121 is the primary transformer winding. In a further preferred embodiment of the present invention, for example, when the embedded transformer is included as a portion of the converter circuit shown in FIG. 6 (described further below), the voltage(s) across the auxiliary winding(s) is (are) fed back to the input circuitry that energizes the first winding 111, with the auxiliary winding(s) acting as feedback winding(s). Alternatively or additionally, the auxiliary winding(s) are able to control other aspect(s) of the input and/or output circuitry. Other implementations of the auxiliary winding(s) including, for example, providing a housekeeping supply or controlling a synchronous rectifier. Further applications of the auxiliary winding(s) are also possible. Furthermore, it is not always necessary to have an auxiliary winding, for example, if a synchronous rectifier is provided on the output side of the transformer and the input side is controlled independently.

The first electrical winding 111 and the second electrical winding 121, together with the one or more auxiliary electrical windings if provided, are wound around the magnetic core 204, which is a common magnetic transformer core. The first electrical winding 111 and the second electrical winding 121 are separate from each other and are wound around non-overlapping areas of the magnetic core 204.

The first electrical winding 111, the second electrical winding 121, and auxiliary electrical windings of the transformer are formed from upper and lower conductive traces positioned on respective top and bottom surfaces of the insulating substrate 200, and electrically connected by a plurality of respective conductive vias passing through the insulating substrate 200 from the top surface of the insulating substrate 200 to the bottom surface of the insulating substrate 200. In FIG. 2, the upper conductive traces (for example, 111a to 111d, and 121a to 121e) are visible. At the ends of the upper conductive traces, the conductive vias (not shown in FIG. 2) extend through the insulating substrate 200 in a thickness direction of the insulating substrate 200, to electrically connect to the lower conductive traces (also not shown in FIG. 2). Accordingly, a complete coil arrangement is formed for the first electrical winding 111 and the second electrical winding 121 (and, if provided, the one or more auxiliary electrical windings). Since the conductive vias pass through the insulating substrate 200, and since the upper and lower traces are disposed on the top and bottom surfaces of the insulating substrate 200, the conductive vias and traces are electrically insulated from the magnetic core 204.

The first electrical winding 111 preferably includes, for example, the same number of inner and outer conductive vias forming the complete first electrical winding, to provide the terminals at either end of the first electrical winding 111 on the same surface of the insulating substrate 200 (for example both of the terminals located on the top surface of the insulating substrate 200, or both of the terminals located on the bottom surface of the insulating substrate 200). Alternatively, for example, the first electrical winding 111 may be provided with an arrangement where there is one more inner conductive via than there are outer conductive vias, or where there is one fewer inner conductive vias than there are outer conductive vias. According to this alternative arrangement, the terminals at either end of the first electrical winding 111 are located on opposing surfaces of the insulating substrate 200. Both of these alternatives, where the end terminals are on the same or opposing sides, may be desirable depending on the location of the input and output circuitry to which the terminals are to be electrically connected, or example. The second electrical winding 121 and/or auxiliary winding(s) may also be arranged similar to the first electrical winding 111, for example.

When the transformer device is in operation, the ratio of the voltages provided across the first electrical winding 111 and the second electrical winding 121 is proportional to the number of turns in each respective winding or electrically connected winding portion. Therefore, the number of turns in each winding is able to be chosen, by adding or removing conductive vias and conductive traces, in order to obtain desirable voltage ratios between the windings. This is particularly desirable in, for example, isolated DC-to-DC converters, which often have strict requirements with respect to the output voltage.

An isolation barrier may be provided, for example, on the top and/or bottom surface of the insulating substrate 200 to provide electrical isolation between the upper (lower) conductive traces of the first electrical winding 111 and the upper (lower) conductive traces of the second electrical winding 121.

The transformer device, when included as a component in a power electronics device, for example, a power converter, is electrically connected to electrical circuitry that controls the first electrical winding 111 and the second electrical winding 121. In some cases, input-side circuitry is electrically connected to the first electrical winding 111, and output-side circuitry is electrically connected to the second electrical winding 121. The components forming the circuitry are preferably mounted, for example, to a printed circuit board (PCB) which is attached to the top surface of the insulating substrate 200, or the components may be mounted directly to the insulating substrate 200.

In the schematic view of FIG. 2, not all of the turns of each of the first electrical winding 111 and the second electrical winding 121 are shown, for clarity. However, with respect to the first electrical winding 111, the first turn 111a and last turn 111d are shown, as well as some of the intermediate turns 111b and 111c. First turn 111a is electrically connected to first end terminal 112, and last turn 111d is electrically connected to second end terminal 113. The electrical connections are schematically shown in FIG. 2 by broken lines. Intermediate turn 111c is electrically connected to first tap terminal 114, and intermediate turn 111b is electrically connected to second tap terminal 115. Circuitry, not shown in FIG. 2, is electrically connectable to the various terminals. An input terminal of the circuitry is electrically connected to first end terminal 112, and one of the output terminals 131, 132, 133 of the circuitry is electrically connected to one of second end terminal 113, first tap terminal 114, or second tap terminal 115 respectively. As shown in FIG. 2, this electrical connection is provided by inserting a zero-Ohm link, jumper, or wire between the respective terminals 131, 132, 133 and 113, 114, 115. In the configuration shown in FIG. 2, the output terminal 132 of the circuitry is electrically connected to first tap terminal 114 by connector 134, while the other terminals are electrically unconnected.

With respect to the second electrical winding 121, the first turn 121a and last turn 121e are shown, as well as some of the intermediate turns 121b, 121c, and 121d. Similar to the first electrical winding 111, not all of the turns of the second electrical winding 121 are shown in FIG. 2, for clarity. First turn 121a is electrically connected to third end terminal 122, and last turn 121e is electrically connected to fourth end terminal 123. Intermediate turn 121d is electrically connected to third tap terminal 124, intermediate turn 121c is electrically connected to fourth tap terminal 125, and intermediate turn 121b is electrically connected to fifth tap terminal 126. Circuitry, not shown in FIG. 2, is electrically connectable to the various terminals. An input terminal of the circuitry is electrically connected to third end terminal 122, and one of the output terminals 141, 142, 143, 144 of the circuitry is electrically connected to one of fourth end terminal 123, third tap terminal 124, fourth tap terminal 125, or fifth tap terminal 126 respectively. As shown in FIG. 2, this electrical connection is provided by inserting a zero-Ohm link, jumper, or wire between the respective terminals 141, 142, 143, 144 and 123, 124, 125, 126. In the configuration shown in FIG. 2, the output terminal 143 of the circuitry is electrically connected to fourth tap terminal 125 by connector 145, while the other terminals are electrically unconnected.

With the second preferred embodiment shown in FIG. 2, a specific turns ratio between the first electrical winding 111 and the second electrical winding 121 is able to be selected by placing at least one of the connectors 134, 145 between the appropriate terminals. If the first electrical winding 111 is an input side or primary winding, the choice of the electrical connection made by connector 134 between respective terminals 131, 132, 133 and 113, 114, 115 provides a selection of the amount (i.e. the number of turns) of the first electrical winding 111 that is energized by the input side circuitry. Similarly, the choice of the electrical connection made by connector 145 between respective terminals 123 to 126 and 141 to 144 provides a selection of the amount (i.e. the number of turns) of the second electrical winding 121 across which an induced voltage is sensed. Connectors 134, 145 are able to, in some preferred embodiments of the present invention, include multipole switches or transistors, and are not limited to hardwired electrical connections.

Figure 3:
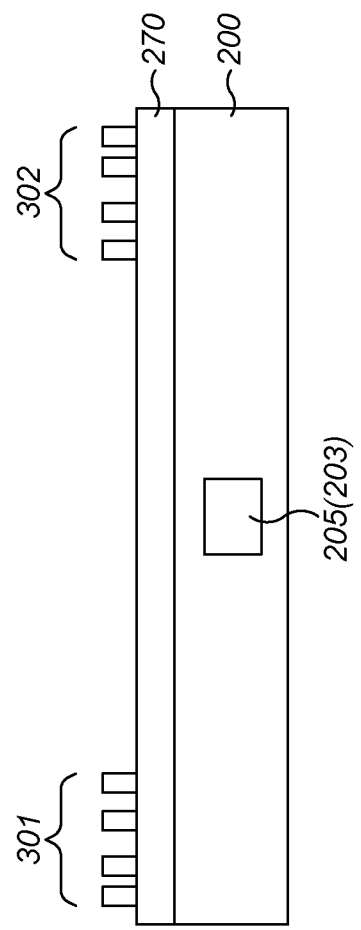
FIG. 3 is a schematic side view of the device shown in FIG. 2.

FIG. 3 shows a schematic side view of the device shown in FIG. 2. The insulating substrate 200 is shown in FIG. 3, together with the opening 205 of the channel 203. A printed circuit board (PCB) 270 is located on a first principal surface of the insulating substrate 200, above the conductive traces forming the first electrical winding 111 and the second electrical winding 121. The PCB 270 includes first electrical components 301 and second electrical components 302, which define a portion of the input side circuitry and the output side circuitry that energize or sense induced voltage in the electrical windings 111, 121.

An insulating cover layer or isolation barrier (not shown in FIG. 3) may be provided on top of the conductive traces, for example, between the principal surface of the insulating substrate 200 and the PCB 270, to increase the isolation properties of the device. In another preferred embodiment of the present invention, PCB 270 is not provided and the electrical components 301, 302 are mounted directly onto a principal surface of the insulating substrate 200.

Figure 4:
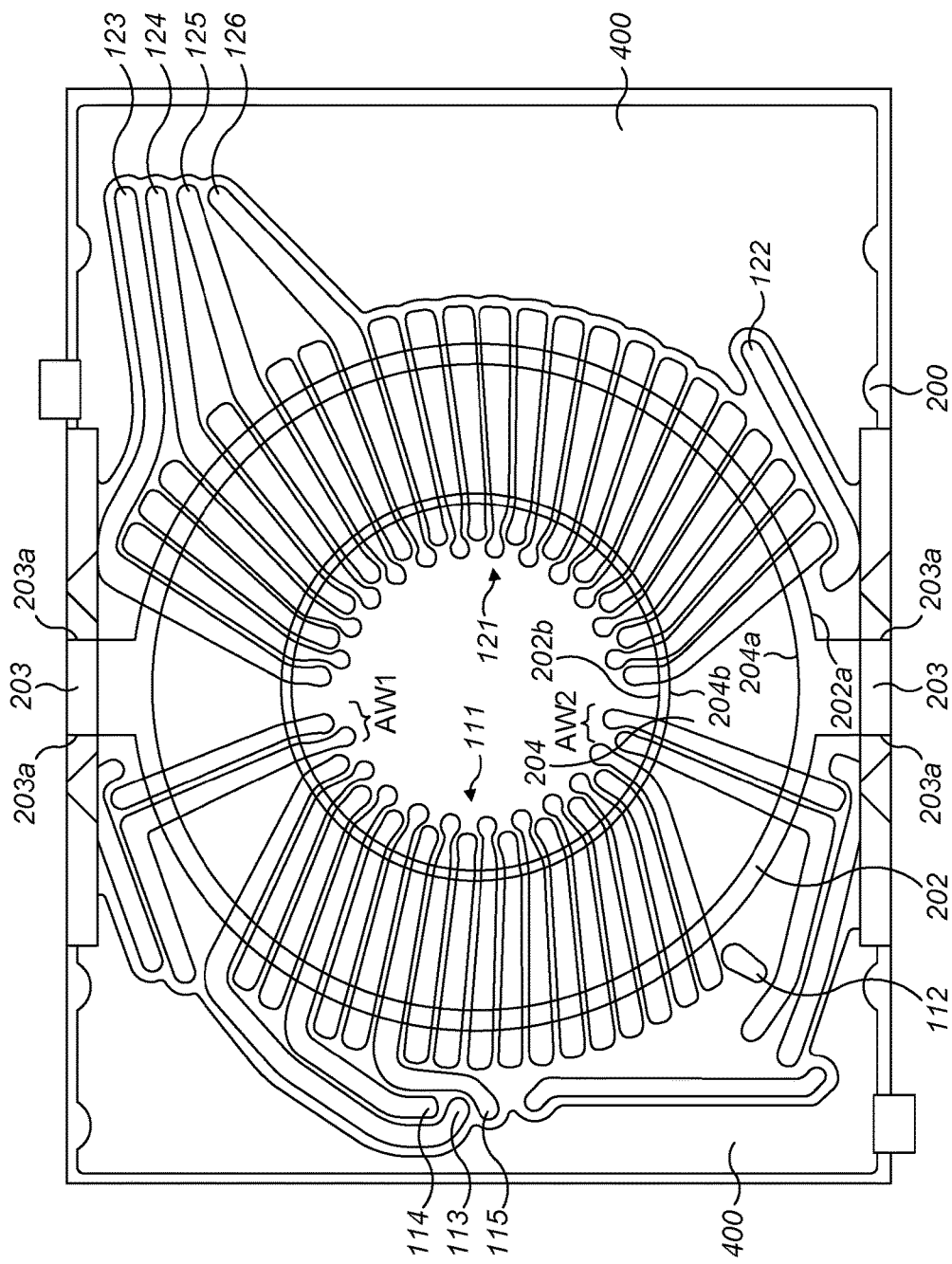
FIG. 4 is an example conductive trace layout included in a transformer device according to a preferred embodiment of the present invention.

FIG. 4 shows an example conductive trace layout included in a transformer device according to a preferred embodiment of the present invention. The locations of the edges 204a, 204b of the magnetic core 204, and the edges 202a, 202b of the cavity 202, are indicated in FIG. 4 for reference. The locations of the channels 203 and channel side walls 203a are also indicated in FIG. 4. The conductive trace layout includes a planar conductor 400. As an example, the planar conductor 400 may be a ground plane.

Conductive traces or tracks forming the first electrical winding 111 and the second electrical winding 121, as well as two auxiliary windings AW1 and AW2, are provided. Corresponding traces are provided on the other principal surface of the insulating substrate 200 which, together with the conductive vias linking the conductive traces together, form complete electrical windings. On the side of the first electrical winding 111, a first end terminal 112 and a second end terminal 113 are provided. Circuitry that is electrically connected between the end terminals 112, 113 is able to energize or sense induced voltage in the whole of the first electrical winding 111. A first tap terminal 114 and a second tap terminal 115 are also provided. Circuitry that is electrically connected between the first end terminal 112 and the first tap terminal 114 is able to energize or sense induced voltage in a portion of the first electrical winding 111 including three fewer turns than the entire first electrical winding 111. Circuitry that is electrically connected between the first end terminal 112 and the second tap terminal 115 is able to energize or sense induced voltage in a portion of the first electrical winding 111 including six fewer turns than the entire first electrical winding 111. Accordingly, three separate configurations are possible in which the effective size of the first electrical winding 111 includes n, n−3, and n−6 turns respectively, where n is the number of turns in the complete first electrical winding 111.

On the side of the second electrical winding 121, a third end terminal 122 and fourth end terminal 123 are provided. Circuitry that is electrically connected across the end terminals 122, 123 is able to energize or sense induced voltage in the whole of the second electrical winding 121. A third tap terminal 124, a fourth tap terminal 125, and a fifth tap terminal 126 are also provided. Circuitry that is electrically connected between the third end terminal 122 and the third tap terminal 124 is able to energize or sense induced voltage in a portion of the second electrical winding 121 including four fewer turns than the entire first electrical winding 121. Circuitry that is electrically connected between the third end terminal 122 and the fourth tap terminal 125 is able to energize or sense induced voltage in a portion of the second electrical winding 121 including six fewer turns than the entire second electrical winding 121. Circuitry that is electrically connected between the third end terminal 122 and the fifth tap terminal 126 is able to energize or sense induced voltage in a portion of the second electrical winding 121 including nine fewer turns than the entire second electrical winding 121. Accordingly, four separate configurations are possible in which the effective size of the second electrical winding 121 includes m, m−4, m−6, and m−9 turns respectively, where m is the number of turns in the complete second electrical winding 121.

By selecting one of the three possible configurations at the side of the first electrical winding 111, and one of the four possible configurations at the side of the second electrical winding 121, one of twelve overall configurations is able to be selected. In principle, the turn ratio for each of the twelve overall configurations is able to be different, although it is possible that two or more of the overall configurations may provide the same turn ratio. Therefore, because a number of different turn ratios are available within a single embedded transformer device, a manufacturer is able to produce and store a single device that is able to be applied to a variety of different applications which may require different turn ratios.

In one example, if a first application requires n turns on the first electrical winding 111 and m−6 turns on the second electrical winding 121, during production, a zero-Ohm link is able to automatically be inserted to electrically connect terminal 113 to terminal 131, and terminal 125 to terminal 143. A second application requiring a different turn ratio is also able to be produced using the same or a similar automated process and the same or a similar transformer device, by inserting the zero-Ohm links to form the desired electrical connections. This leads to more efficient production and stock control, and improves automation within a manufacturing facility of the embedded transformer devices.

In a further example, embedded transformer devices according to a preferred embodiment of the present invention are switchable between different configurations. For example, multipole switches or transistor arrays are able to be included to provide the electrical connections required to set the number of turns on each of the first electrical winding 111 and the second electrical winding 112. Thus, the turn ratio is able to be conveniently adjusted, for example, when testing the device while applying various input voltage supplies and load characteristics. In addition, the device manufacturer is able to provide a 'generic' embedded transformer device which is able to then be set up, for example, by a customer or further on in a production chain, to provide the specific turn ratio desired or required by the final application.

In another example, a switchable embedded transformer device according to a preferred embodiment of the present invention may be dynamically adjustable, for example, by a transistor array. The transistor array may be electrically connected to sensing circuitry, and the device may be able to automatically switch different windings in and out of the transformer to match changing supply or load conditions.

Figure 5:
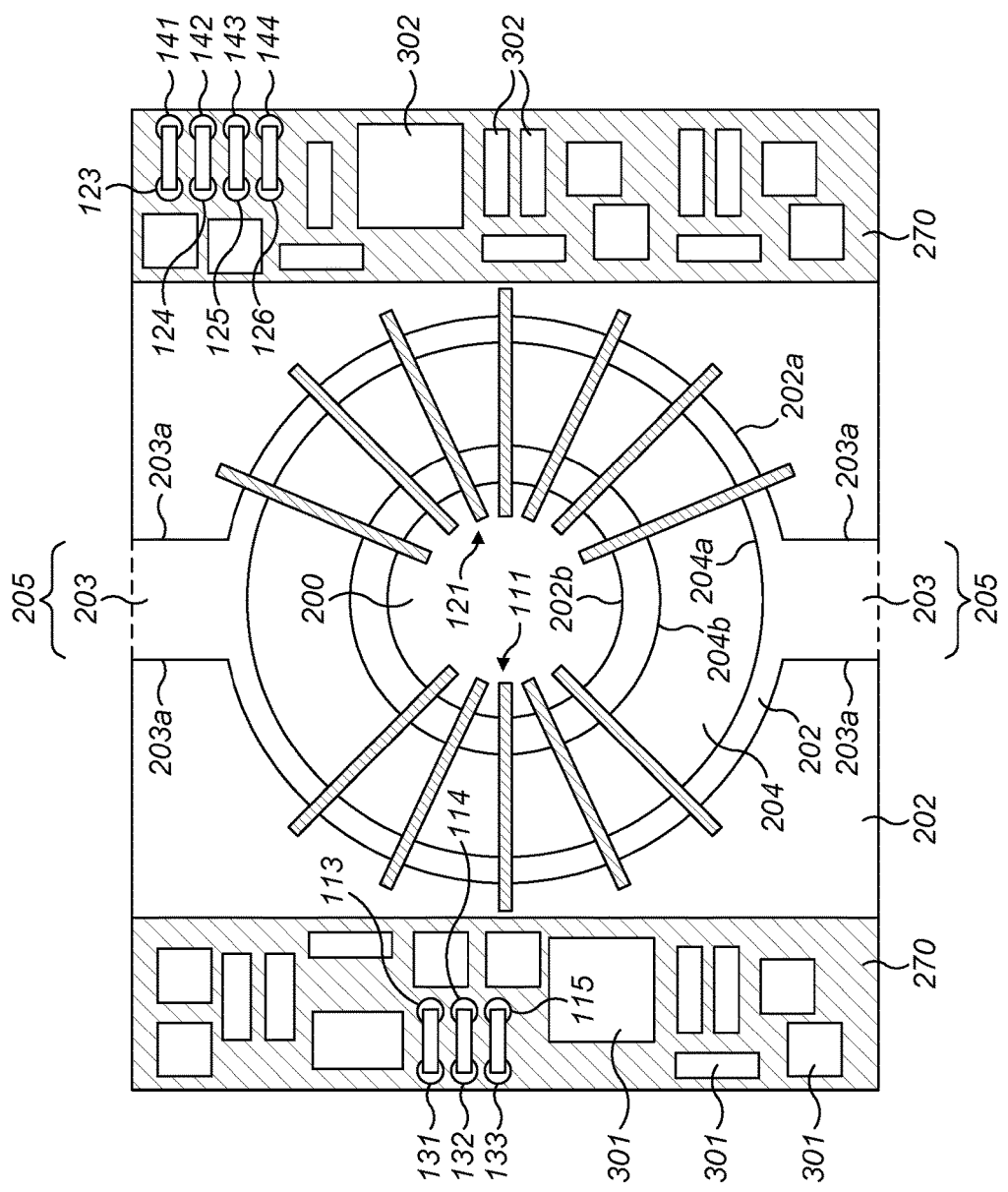
FIG. 5 shows a view of the device shown in FIG. 2 in which electrical components are mounted onto a printed circuit board.

FIG. 5 shows a view of the embedded transformer device shown in FIG. 2 in which the electrical components 301, 302 are mounted onto PCB 270. For clarity, not all electrical components are labelled in FIG. 5. The reference numbers shown in FIG. 5 correspond to those included in the above-described FIGS. 1-4 and the corresponding description thereof will not be repeated here. As shown in FIG. 5, none of the electrical connections are made between terminals 131, 132, 133 and 113, 114, 115 respectively, or between terminals 123 to 126 and 141 to 144 respectively. Accordingly, the device of FIG. 5 is able to be set into a specific configuration, for example, by the manufacturer, customer, or user inserting zero-Ohm links at the appropriate locations as described above.

As shown in FIG. 5, the first set of terminals 131, 132, 133, 113, 114, 115 are centrally located at the left-hand edge of the PCB 270. The second set of terminals 123 to 126 and 141 to 144 are located in the top right corner of PCB 270. These locations are chosen because, for example, they provide short paths to nearby or adjoining components, for example, rectifying diodes. Locating the terminals at the PCB edges also increases their accessibility, for example, to adjust their electrical connections at a later time.

Figure 6:
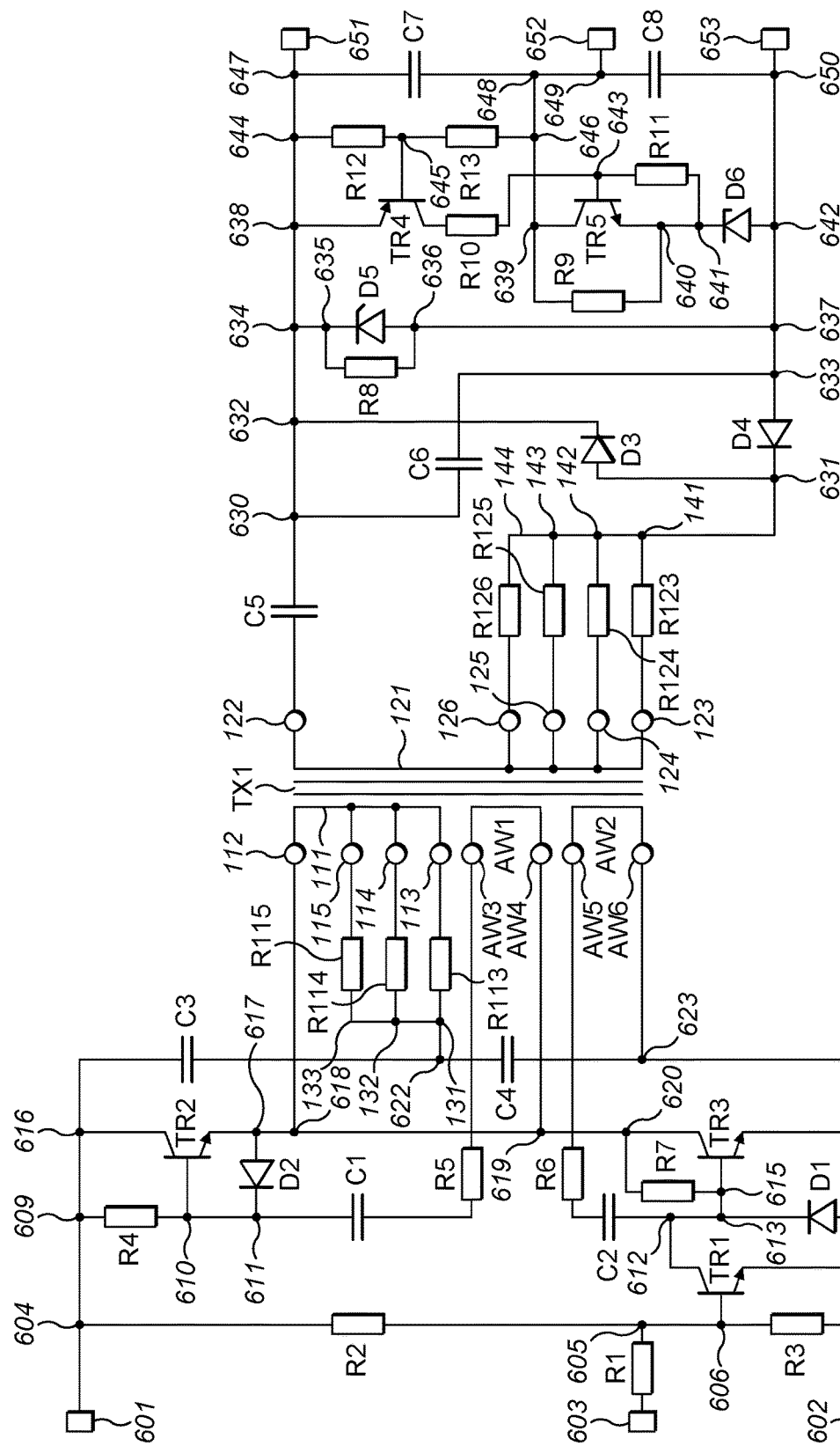
FIG. 6 is a diagram of an example circuit of the embedded transformer device according to a preferred embodiment the present invention.

FIG. 6 is a diagram of an example of a self-oscillating push-pull or half-bridge Royer circuit which a synchronized rectifier on the output side, which includes the embedded transformer device TX1 according to a preferred embodiment of the present invention. The transformer TX1 includes a primary electrical winding 111 between end terminals 112 and 113, and a secondary electrical winding 121 between end terminals 122 and 123. A first auxiliary winding AW1 is provided between terminals AW3 and AW4, and a second auxiliary winding AW2 is provided between terminals AW5 and AW6. Primary winding tap terminals 114, 115 and secondary winding tap terminals 124, 125, 126 are also provided.

The input side includes power supply terminals 601 and 602, along with intermediate supply terminal 603. In one example, terminal 601 may be provided with a positive DC input voltage, and terminal 602 may be connected to a ground potential. Terminal 601 is electrically connected to node 604, terminal 603 is electrically connected via resistor R1 to node 605, and terminal 602 is electrically connected to node 607. Resistor R2 is electrically connected between nodes 604 and 605, and resistor R3 is electrically connected between nodes 605 and 607. Node 606 is electrically connected to node 605. Transistors TR1, TR2, and TR3 are provided on the input side and, for example, may be NPN type transistors. The base of transistor TR1 is electrically connected to node 606, and the emitter is electrically connected to node 608 which is electrically connected to node 607. Node 614 is electrically connected to node 608, and diode D1 is provided between node 614 and node 613. The collector of transistor TR1 is electrically connected to node 613 via node 612. Node 612 is electrically connected, via capacitor C2 and resistor R6, to auxiliary winding AW1 at terminal AW5. Node 613 is electrically connected to node 615, which is in turn electrically connected to the base of transistor TR3 and to node 620 via resistor R7. The emitter of transistor TR3 is electrically connected to node 614 via node 621, and the collector of transistor TR3 is electrically connected to node 620. Node 621 is electrically connected to node 623 and to terminal AW6 of auxiliary winding AW2.

Terminal AW4 of auxiliary winding AW1 is electrically connected to node 620 via node 619. Terminal AW3 of auxiliary winding AW1 is electrically connected, via resistor R5 and capacitor C1, to node 611. Node 611 is electrically connected to node 610. Node 610 is electrically connected to node 604 via resistor R4 and node 609. Node 609 is electrically connected via node 616 to the collector of transistor TR2. The base of transistor TR2 is electrically connected to node 610, and the emitter is electrically connected to node 617. Diode D2 is provided between node 617 and node 611. Node 617 is electrically connected to node 618, which is in turn electrically connected to the first end terminal 112 of the first electrical winding 111. The second end terminal 113 and tap terminals 114, 115 of the first electrical winding 111 are each electrically connected to node 622 via respective connectors R113, R114, R115 and terminals 131, 132, 133. One of the connectors R113, R114, R115 may include, for example, a zero-Ohm link as described above. The other two connectors are electrically unconnected and left as an open circuit. Node 622 is electrically connected to node 616 via capacitor C3, and is also electrically connected to node 623 via capacitor C4.

The output side includes node 630, which is electrically connected via capacitor C5 to end terminal 122 of the second electrical winding 121. Node 630 is electrically connected via capacitor C6 to node 633, and node 633 is electrically connected via diode D4 to node 631. Node 631 is electrically connected to node 632 via diode D3, and node 632 is electrically connected to node 630. The other end terminal 123 and tap terminals 124, 125, 126 of the second electrical winding 121 are each electrically connected to node 631 via respective connectors R123, R124, R125, R126 and terminals 141, 142, 143, 144. One of the connectors R123, R124, R125, R126 may include, for example, a zero-Ohm link as described above. The other three connectors are unconnected and left as an open circuit. Node 632 is electrically connected to node 634, and node 633 is electrically connected to node 637. Diode D5 is electrically connected between nodes 634 and 637. A resistor R8 is electrically connected in parallel with diode D5, and is electrically connected to node 634 via node 635, and to node 637 via node 636.

Two transistors TR4 and TR5 are provided on the output side. For example, transistor TR4 may be a PNP type transistor, and transistor TR5 may be a NPN type transistor. The emitter of transistor TR4 is electrically connected to node 638, which is in turn electrically connected to node 634. The base of transistor TR4 is electrically connected to node 645, which is in turn electrically connected to node 644 via resistor R12 and to node 646 via resistor R13. Node 644 is electrically connected to node 638, and node 646 is electrically connected to node 639. The collector of transistor TR4 is electrically connected to node 643 via resistor R10.

The base of transistor TR5 is electrically connected to node 643, and the collector of transistor TR5 is electrically connected to node 639. The emitter of transistor TR5 is electrically connected to node 640, which is electrically connected to node 639 via resistor R9. Node 640 is electrically connected to node 641. Node 641 is electrically connected to node 643 via resistor R11, and also to node 642 via diode D6. Node 642 is electrically connected to node 637.

Node 644 is electrically connected to node 647, node 646 is electrically connected to node 648 and node 649, and node 642 is electrically connected to node 650. Capacitor C7 is provided between nodes 647 and 648, and capacitor C8 is provided between nodes 649 and 650. First output terminal 651 is electrically connected to node 647, and second output terminal 653 is electrically connected to node 650. Intermediate output terminal 652 is electrically connected to node 649. In one example, node 651 may provide a high DC output voltage, and node 653 may provide a ground or substantially ground voltage.

The circuit of FIG. 6 may function as and define a DC-to-DC converter, for example. The transistors on the input side respond to the voltage induced in the auxiliary windings AW1 and AW2 and continuously switch the direction of current flowing through the first electrical windings 111 back and forth to generate an AC voltage. This AC voltage induces a transformed AC voltage in the second electrical windings 121, according to the selected turn ratio as described above. The arrangement of transistors and diodes on the output side rectifies the transformed AC voltage to provide a DC voltage between output terminals 651 and 653. It should be noted that the DC-to-DC converter circuit of FIG. 6 is shown only as an example, and the embedded transformer of the present invention is able to be included in a wide variety of other circuits.

Although reference is made to conductive vias throughout the present application, it should be noted that any conductive connecting element or component, for example, conductive pins, cab be included in place of any one or more of the conductive vias. Furthermore, the first electrical winding 111 and the second electrical winding 121 are able to each either be primary transformer windings electrically connected to the input power supply of the transformer, or secondary transformer windings electrically connected to the output of the transformer. The embedded transformer device is able to be either a step-up or step-down transformer.

Further, although in the above examples the magnetic core 204 and cavity 202 are shown as being circular or substantially circular in shape, they may include a different shape in other preferred embodiments of the present invention. Non-limiting examples include an oval, substantially oval, elongate toroidal, or substantially toroidal shape; a toroidal or substantially toroidal shape including a gap; EE, EI, I, EFD, EP, UI, or UR core shapes; and the like. The magnetic core 204 may be coated with an insulating material to significantly reduce or prevent the occurrence of breakdown between the conductive magnetic core and the conductive vias or metallic traces. The magnetic core may also include chamfered edges to provide a profile or cross-section that is rounded.

Various modifications to the preferred embodiments of the present invention described above are possible and will occur to those skilled in the art without departing from the scope of the invention which is defined by the following claims. In particular, it should be understood that features described in relation to a single embodiment of the present invention are able to be included in other embodiments of the present invention. The scope of the present invention, therefore, is to be determined solely by the following claims.

The invention claimed is:

1. An embedded magnetic component transformer device, comprising:
   an insulating substrate including a first side and a second side opposite the first side, the substrate including a cavity located therein;
   a magnetic core located within the cavity;

a first electrical winding that passes through the insulating substrate and that is wound around a first section of the magnetic core; and a second electrical winding that passes through the insulating substrate and that is wound around a second section of the magnetic core not overlapping with the first section of the magnetic core; wherein each of the first and second electrical windings includes conductive connectors passing through the insulating substrate adjacent to or in a vicinity of the magnetic core, upper conductive traces disposed on the first side of the insulating substrate, and lower conductive traces disposed on the second side of the insulating substrate;

the first electrical winding includes a first end terminal, a second end terminal, and a first tap terminal located between the first and second end terminals;

the device includes circuitry with a first output terminal and a first input terminal electrically connected to the first end terminal;

in a first configuration of the circuitry, the first output terminal is electrically connected to the second end terminal, and the circuitry energizes a whole of the first electrical winding between the first end terminal and the second end terminal or senses a voltage induced across the whole of the first electrical winding between the first end terminal and the second end terminal;

in a second configuration of the circuitry, the first output terminal is electrically connected to the first tap terminal, and the circuitry energizes a portion of the first electrical winding between the first end terminal and the first tap terminal or senses a voltage induced across a portion of the first electrical winding between the first end terminal and the first tap terminal;

the second electrical winding includes a third end terminal, a fourth end terminal, and a third tap terminal located between the third and fourth end terminals;

the circuitry of the device includes a second output terminal and a second input terminal electrically connected to the third end terminal;

in a fourth configuration of the circuitry, the second output terminal is electrically connected to the fourth end terminal, and the circuitry energizes a whole of the second electrical winding between the third end terminal and the fourth end terminal;

in a fifth configuration of the circuitry, the second output terminal is electrically connected to the third tap terminal, and the circuitry energizes a portion of the second electrical winding between the third end terminal and the third tap terminal;

the first output terminal, the second end terminal, and the first tap terminal are located on a principal surface of the device;

the second output terminal, the fourth end terminal, and the third tap terminal are located on a principal surface of the device;

the first output terminal is located at or in a vicinity of an edge of the insulating substrate, and the first tap terminal is located between the first electrical winding and the first output terminal;

the second output terminal is located at or in a vicinity of the opposite edge of the insulating substrate to the first output terminal, and the third tap terminal is located between the second electrical winding and the second output terminal.

2. The device of claim 1, further comprising a switch that switches between the first configuration and the second configuration.

3. The device of claim 2, wherein the switch is a transistor.

4. The device of claim 2, wherein the switch is a multi-pole switch.

5. The device of claim 1, further comprising a hardwired connector that sets the device into the first configuration or the second configuration.

6. The device of claim 5, wherein the hardwired connector is a zero-Ohm link or a jumper.

7. The device of claim 1, further comprising an auxiliary electrical winding that passes through the insulating substrate and that is wound around a third section of the magnetic core not overlapping with the first or second sections of the magnetic core.

8. The device of claim 1, wherein the first electrical winding includes a second tap terminal located between the first tap terminal and the first end terminal; and in a third configuration of the circuitry, the first output terminal is electrically connected to the second tap terminal.

9. The device of claim 8, wherein:

in the third configuration of the circuitry, the circuitry energizes a portion of the first electrical winding between the first end terminal and the second tap terminal, the portion including fewer turns than are energized in the second configuration.

10. The device of claim 8, wherein:

in the third configuration of the circuitry, the circuitry senses a voltage induced across a portion of the first electrical winding between the first end terminal and the second tap terminal, the portion including fewer turns than are sensed in the second configuration.

11. The device of claim 1, wherein:

in the fourth configuration of the circuitry, the circuitry senses a voltage induced across the whole of the second electrical winding between the third end terminal and the fourth end terminal; and in the fifth configuration of the circuitry, the circuitry senses a voltage induced across a portion of the second electrical winding between the third end terminal and the third tap terminal.

12. The device of claim 1, wherein the second electrical winding includes a fourth tap terminal located between the third tap terminal and the third end terminal; and in a sixth configuration of the circuitry, the second output terminal is electrically connected to the fourth tap terminal.

13. The device of claim 12, wherein:

in the sixth configuration of the circuitry, the circuitry energizes a portion of the second electrical winding between the third end terminal and the fourth tap terminal, the portion including fewer turns than are energized in the fifth configuration.

14. The device of claim 12, wherein:

in the sixth configuration of the circuitry, the circuitry senses a voltage induced across a portion of the second electrical winding between the third end terminal and the fourth tap terminal, the portion including fewer turns than are sensed in the fifth configuration.

15. The device of claim 1, wherein the location of the first output terminal is equidistant or substantially equidistant from two corners of the insulating substrate that are electrically connected by the edge.

16. The device of claim 1, wherein the second output terminal is located at or in a vicinity of a corner of the insulating substrate.

* * * * *